United States Patent
Klein

(12) 
(10) Patent No.: US 6,621,800 B1
(45) Date of Patent: Sep. 16, 2003

(54) MESSAGE MONITOR APPLICATION CONCEPT AND IMPLEMENTATION

(75) Inventor: Robert M. Klein, Denver, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/490,408

(22) Filed: Jan. 24, 2000

(51) Int. Cl.[7] ............................. H04B 1/44; H04L 12/66
(52) U.S. Cl. ....................... 370/282; 379/67.1; 370/352
(58) Field of Search ................................. 370/259, 270, 370/271, 276, 277, 278, 282, 351–3, 354–6, 389; 379/15.02, 67.1, 68–70, 84, 85, 88.12, 88.17, 88.22, 93.01

(56) References Cited

U.S. PATENT DOCUMENTS

| | | | | |
|---|---|---|---|---|
| 4,555,781 A | * | 11/1985 | Baldry et al. ............... | 370/260 |
| 4,893,248 A | * | 1/1990 | Pitts et al. .................. | 705/400 |
| 4,935,954 A | * | 6/1990 | Thompson et al. ...... | 379/88.04 |
| 5,745,532 A | * | 4/1998 | Campana, Jr. .............. | 375/347 |
| 5,806,000 A | * | 9/1998 | Vo et al. ...................... | 455/466 |
| 5,946,386 A | * | 8/1999 | Rogers et al. .......... | 379/265.09 |
| 6,272,190 B1 | * | 8/2001 | Campana, Jr. .............. | 375/347 |
| 6,370,375 B1 | * | 4/2002 | Shively ....................... | 455/412 |

FOREIGN PATENT DOCUMENTS

WO    WO 9966703 A1 * 12/1999    ............ H04M/3/50

* cited by examiner

Primary Examiner—David Vincent
(74) Attorney, Agent, or Firm—Sheridan Ross P.C.

(57) ABSTRACT

A voice messaging system allowing the monitoring of telephone calls is provided. The system permits subscribers to monitor incoming calls handled by voice messaging systems, and to selectively listen to the message as it is recorded, ignore the message, or establish two-way audio communications with the caller. The system further provides these monitoring capabilities to the subscriber at any location having access to a computer network that is interconnected to the message server, for example the Internet. The present invention is particularly well-suited for use with telephones that are part of private branch exchanges, telephones subscribing to central voice messaging systems, and telephones whose lines are used for the transmission of computer data in addition to voice communications.

20 Claims, 6 Drawing Sheets

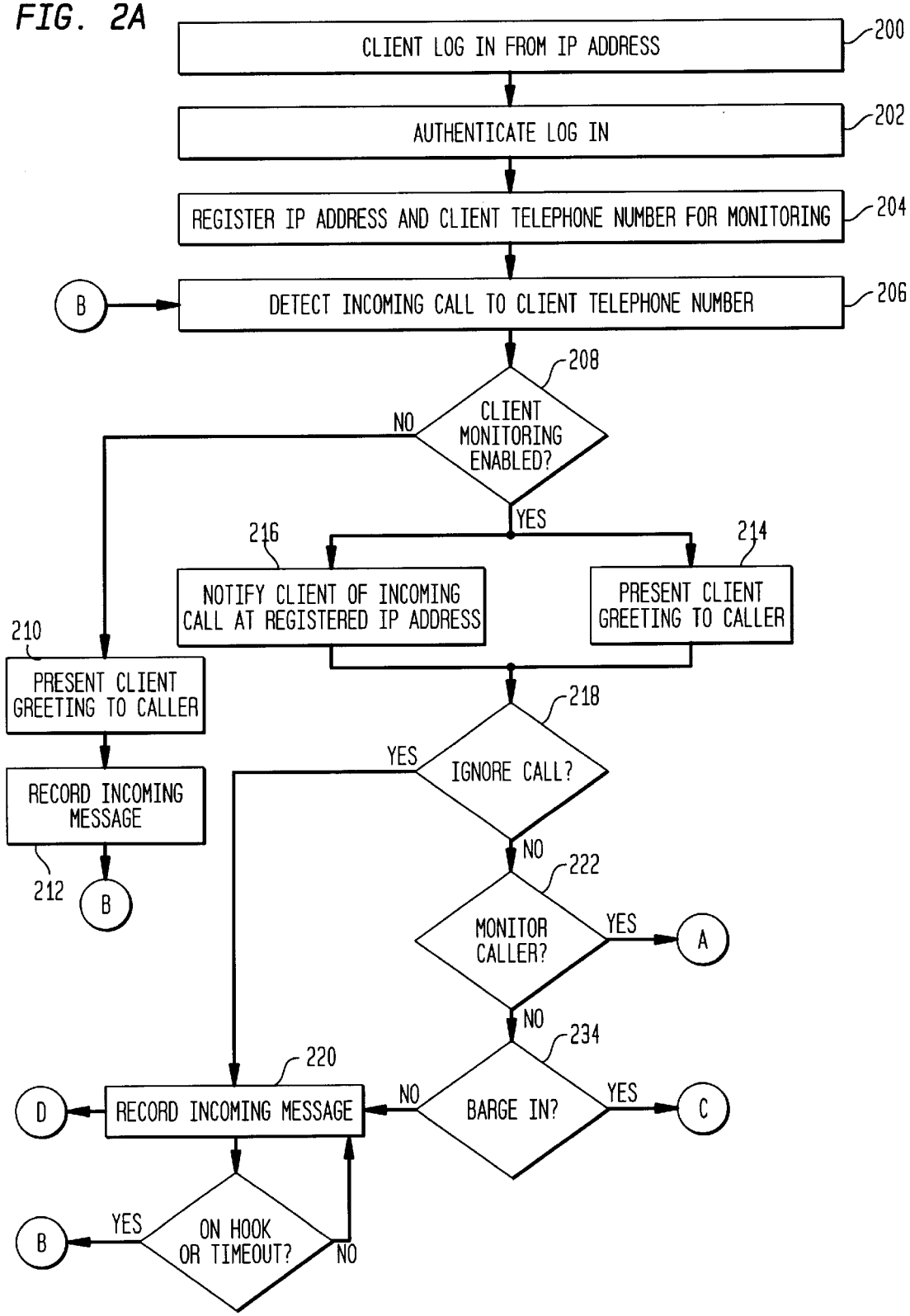

MESSAGE MONITOR APPLICATION CONCEPT AND IMPLEMENTATION

FIELD OF THE INVENTION

The present invention relates to automated telecommunications voice messaging systems.

BACKGROUND OF THE INVENTION

In recent years, telemarketing has become increasingly common. Because the target of such calls often does not wish to be subjected to an unsolicited sales pitch, it is desirable to monitor or screen telephone calls in realtime before answering them. The simple telephone answering machine allows messages from callers to be listened to as the messages are dropped into the answering machine's recording device. If the user so chooses, he or she can barge into the call and speak directly with the caller. If the user does not wish to speak with the caller, the recording of the message can be allowed to proceed normally.

As an alternative to the answering machine, server-based voice message systems for answering calls when a user is not available are offered by various service providers. For example, a residential user may subscribe to a voice messaging service offered by that user's local telephone company. In a business setting, the user's telephone may be part of a private branch exchange or other system interconnected to a voice messaging system. Although such voice mail systems provide users with a wide variety of desirable functions, they do not provide a call screening function. The call screening function could be provided by the addition of certain hard-wired connections to conventional voice messaging systems, but such a solution would be expensive to implement and relatively inflexible in operation. Accordingly, the screening of calls answered by voice messaging systems is generally impossible from telephones that subscribe to a voice mail service.

Conventional answering machine and voice messaging systems also offer a user no way to monitor telephone calls placed to his or her telephone number when the user is away from the telephone or when the telephone line is otherwise in use. Therefore, although certain existing voice mail systems allow users remote access to a log of calls placed to their telephone number and any associated message, there is no provision for realtime monitoring of telephone calls from a remote location. Furthermore, where the user's telephone line is being used to provide the user with a connection to a network such as the Internet, conventional systems do not provide realtime monitoring of telephone calls placed to the user's line.

SUMMARY OF THE INVENTION

The present invention is directed to solving these and other problems and disadvantages of the prior art. Generally, according to the present invention, a messaging system is interfaced with a client computer such that when a message is deposited in a mailbox belonging to a subscriber of the messaging system, a copy of that message is automatically sent to the client computer for screening. According to the present invention, the deposited message is transmitted to the client computer using a packet-based communication protocol. Additionally, the present invention provides the subscriber with the ability to barge into a call as a message is being deposited, and to speak with the caller directly in realtime.

In particular, the present invention provides a software subsystem employing Voice-over Internet Protocol (VoIP) audio transmission and generic TCP/IP remote procedure calls to provide a client application that can communicate with the centralized messaging server of a voice mail system using a TCP/IP-based network. A client application in the form of a graphical user interface (GUI) running on the client computer enables the user or subscriber to log in to the messaging server by providing information such as the telephone number to be monitored and a password for authentication. At the time the subscriber logs in, the IP address and connecting port number (i.e. TCP/IP socket) of the client computer is registered with the centralized messaging server to allow communications between the client computer and the messaging server.

According to the present invention, an incoming call that has been transferred to the messaging server is checked against the server's database of telephone lines or extensions to monitor. The messaging server of the present invention can be used in connection with a private branch exchange (PBX) that is part of a private enterprise, or as part of the public switched telephony network (PSTN). For purposes of simplification, the present application will describe the invention in the context of a private branch exchange having associated telephone extensions, although the invention is equally applicable to telephone lines associated with the public switched telephony network. If the incoming call has been made to an extension that the server has been instructed to monitor, notification of the incoming call is made to the subscriber at the registered IP address over the TCP/IP-based network. The GUI associated with the client computer allows the subscriber to ignore the call, monitor the call, or barge in. When the call is ignored, the incoming message is stored normally on the messaging server. If the subscriber chooses to monitor the call, a recording of the message is stored normally on the messaging server and the message is provided in realtime to the subscriber at the client computer over the TCP/IP-based network. Finally, if the subscriber chooses to barge in, the messaging server issues a message to the caller that the subscriber is available, and establishes two-way communications between the subscriber and the caller, with at least a portion of the communication circuit between the messaging server and the subscriber being completed over the TCP/IP-based network.

These and other advantages and features of the invention will become more apparent from the following description of an illustrative embodiment of the invention taken together with the drawings.

BRIEF DESCRIPTION OF THE DRAWINGS

FIGS. 2A, 2B and 2C are functional flow diagrams of message monitor related operations according to an embodiment of the present invention;

DETAILED DESCRIPTION

Figure 1:
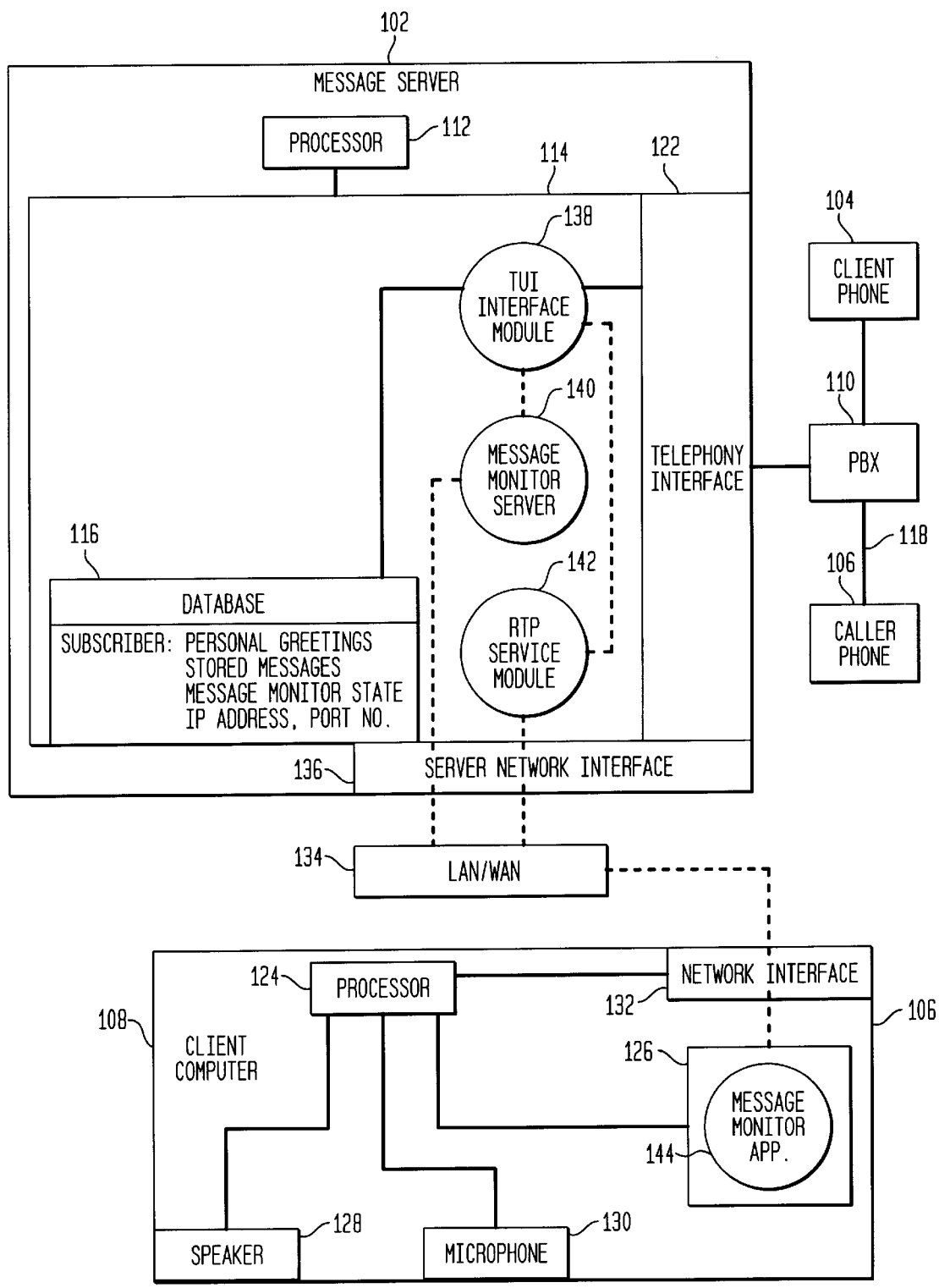
FIG. 1 is a block diagram of a messaging system that includes an illustrative embodiment of the present invention.

FIG. 1 shows a realtime messaging system 100 that includes an illustrative message monitor arrangement configured according to the present invention. The arrangement generally comprises a message server 102, a user or subscriber telephone 104, a caller telephone 106, and a client computer 108. Also shown in FIG. 1 is private branch exchange (PBX) 110, to which the subscriber telephone 104 is interconnected, although a PBX 110 is not a required component of the messaging system 100. The message server 102 may be any telephony messaging system, such as the Intuity Audix®, or AnyPath® messaging systems of Lucent Technologies Inc. The message server 102 is generally a stored program controlled apparatus, having a processor 112 for executing control programs stored in storage 114 to provide subscribers with messaging services. Storage 114 may be any computer-readable storage medium. Storage 114 also includes a database 116 for providing message mailboxes for each subscriber of the messaging service and for storing associated information.

In general, the caller telephone 106 establishes a connection to the subscriber telephone 104, and the telephones 104 and 106 are in turn interconnected to the message server 102. In the embodiment illustrated in FIG. 1, the communication link between the caller telephone 106 and the subscriber telephone 104 is made at least partially through a PBX 110. However, the PBX 110 is not necessary to the present invention, and the connection can be made between the caller telephone 106 and the subscriber telephone 104 entirely over the public switched telephony network (PSTN) 118, such as where the caller telephone 106 and the subscriber telephone 104 are not part of a PBX 110. Alternatively, the connection between the subscriber telephone 104 and the caller telephone 106 could be entirely over a PBX 110, for instance, where the telephones 104 and 106 are part of the same business establishment.

The message server 102 is, according to the illustrated embodiment, connected to the PBX 110 by a communications line 120. The communications line 120 may be a standard analog tip-ring telephony interface, or a TI line or other high band-width communications link. In an alternative embodiment, such as where the subscriber telephone 104 is not part of a PBX 110, the link between the message server 102 and the subscriber telephone 104 may be made over the PSTN 118. Similarly, the connection between the message server 102 and the caller telephone 106 may be made over the PSTN 118. Alternatively, the connections between the telephones 104 and 106, and between the telephones 104 and 106 and the message server 102, may be made using Internet Protocol (IP) telephony techniques, for example Voice Over Internet Protocol telephony based upon the ITU H.323 standard. A telephony interface 122 is provided as an interface between the communications line 120 and the message server 102. The telephony interface 122 generally comprises hardware and low level operating programs for interfacing the control programs of the message server 102 with the communications line 120.

The client computer 108 generally includes a processor 124, storage 126, a speaker 128, a microphone 130, and a network interface 132. The client computer 108 is interconnected to the message server 102 by a computer network 134. The computer network 134 may be any local area network (LAN) or wide area network (WAN). For instance, the computer network 134 may be the public Internet or a private Intranet. The computer network 134 is interconnected to the message server through the server network interface 136. In general, the client computer 108 may comprise any device capable of communicating over a computer network and having an associated speaker and microphone. Therefore, although the client computer 108 is generally a personal computer equipped with a speaker 128 and a microphone 130, other devices may be used in its place. For instance, the client computer 108 may comprise a web browser device having an associated microphone for use in connection with a television and an Internet connection. Other suitable devices include personal information managers (PIMs) configured for connection to a network and having a speaker and a microphone.

According to the present invention, control programs stored in the storage 114 of the message server 102 include a telephony user interface (TUI) module 138, a message monitor server 140, and a remote transmission protocol (RTP) service module 142. Although these software modules are mentioned separately, they may be included in a single control program. The database 116 serves to store information concerning individual subscribers, such as the subscribers' telephone numbers, the subscribers' personal greetings, a mailbox containing stored messages for each subscriber, and a registry of subscriber telephone numbers to be monitored, as will be described in greater detail below.

The storage 126 associated with the client computer 108 generally includes a message monitor application program 144 for communicating messaging information between the message server 102 and the client computer 108 across the computer network 134, and for presenting the client with a GUI for controlling functions of the realtime messaging system 100.

Figure 2B:
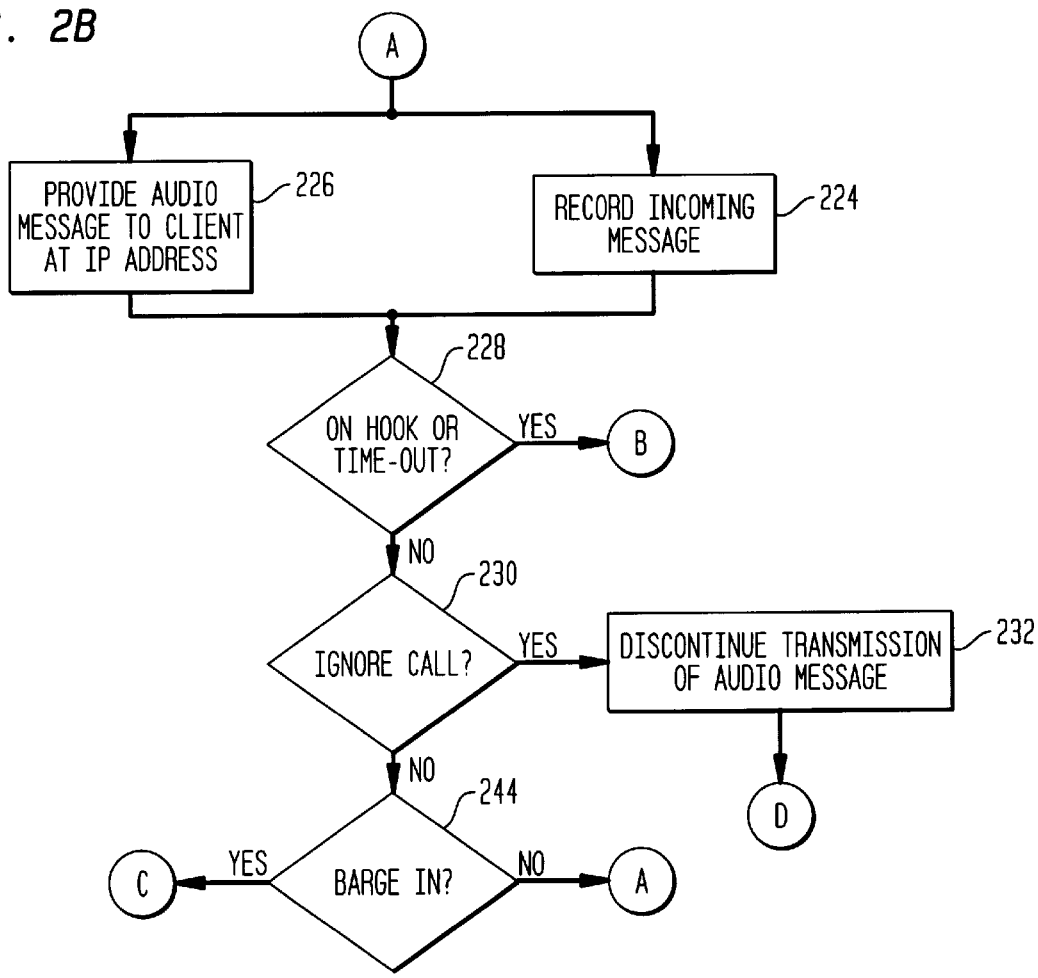
Figure 2C:
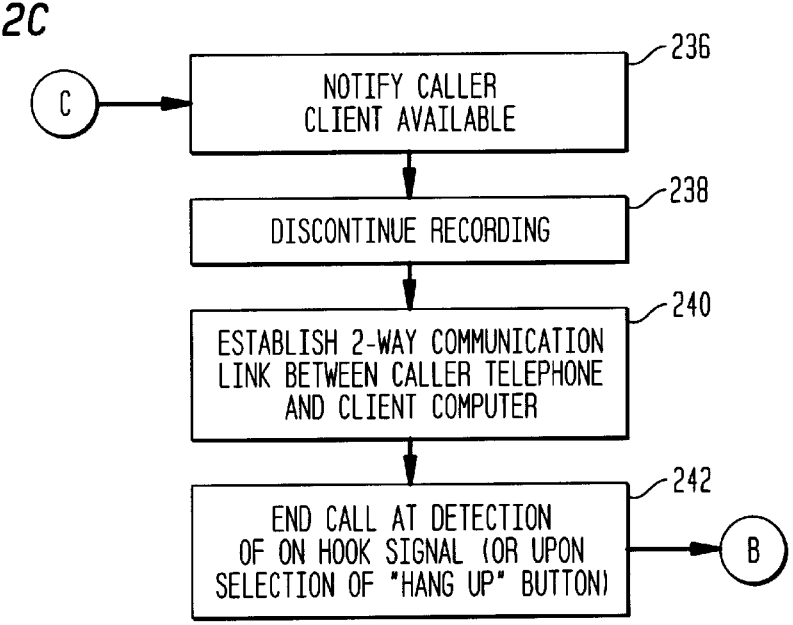
Figure 3:
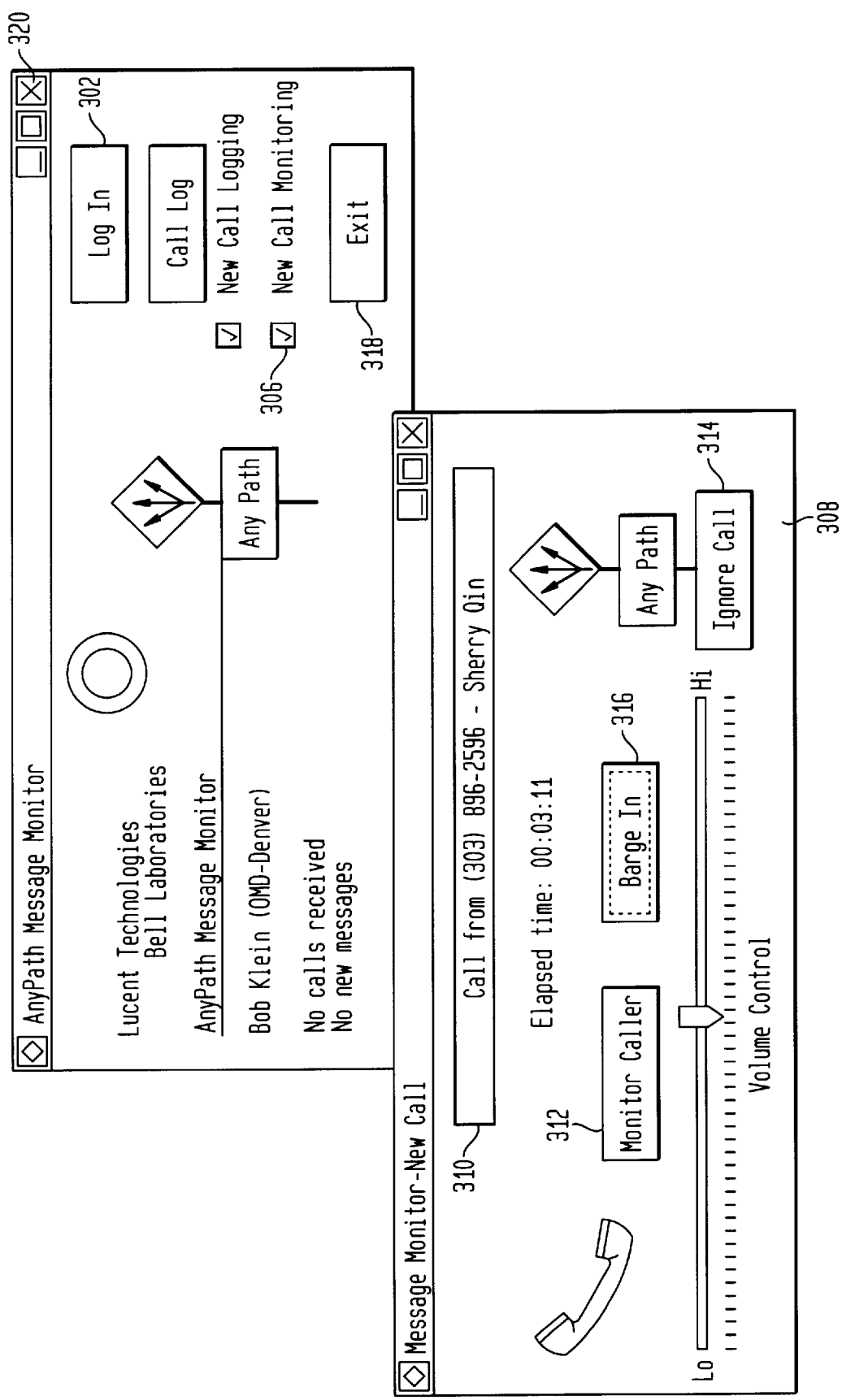
FIG. 3 is a screen shot of a GUI window according to an embodiment of the present invention.

The functionality of the system 100 illustrated in FIG. 1 in providing a message monitoring capability is illustrated in FIGS. 2A, 2B and 2C. Referring now to FIG. 2A, message monitoring is initiated by the subscriber when he or she logs in at step 200. The client log in 200 typically requires the subscriber (i.e., the user) to enter their telephone number and an authentication code. Generally, the login 200 is accomplished by starting the message monitor program 144 stored in the client computer 108 and selecting the option to log in by pressing the log in button 302 in the message monitor window 304 (see FIG. 3). The monitoring of new calls in realtime can be selected by checking the appropriate box 306 in the message monitor window 304. The message monitor program, through a remote procedure call (RPC) request, such as a traditional RPC mechanism, JAVA RMI, Active X or DCOM/COM, informs the message server that monitoring of new calls is desired. This request is identified by the IP address and socket of the client computer 108 and the message monitor program 144. At step 202, the message server 102 authenticates the log-in by accessing administrative records in the database 116 to verify that a valid telephone number and authentication code pair have been entered. At step 204, the address and socket of the client computer 108 and message monitor program 142 used to log in the subscriber are registered in the message monitor server 140, and the subscriber telephone 104 number is registered in the TUI interface module 138 for monitoring.

When a caller seeks to establish a communications link with a subscriber, for example, by placing a telephone call to a monitored subscriber telephone 104, and the subscriber telephone 104, for example, is busy or is not taken off-hook within a specified number of rings (step 206), the unanswered call is redirected to the TUI interface module 138 of the message server 102 by the PBX (or PSTN). The techniques used for the redirection of the unanswered call are well known in the art. The TUI interface module 138 retrieves the personal greeting corresponding to the subscriber telephone 104 from the database 116 and plays that message to the caller telephone 106 through, in the illustrated example, the telephony interface 122, the communications line 120, and the PSTN 118. At the same time, the TUI interface module 138, at step 208, queries the registry of monitored extensions to determine whether monitoring of the called telephone number has associated with it the command to monitor all incoming telephone calls. If monitoring is not enabled, the stored subscriber greeting is presented to the caller at step 210, and the caller may record a message for the subscriber at step 212, which is stored in the subscriber's mailbox in the database 116. The TUI interface module 138 then returns to step 206 to await additional incoming calls.

If client monitoring is enabled, the subscriber's personal greeting is retrieved from the database 116 and played to the caller at step 214 normally. In addition, and at substantially the same time as performing step 214, the TUI interface module 138 alerts the message monitor server 140 that a message requiring monitoring is being received. The message monitor server 140 retrieves the IP address information corresponding to the client computer 108, and sends an asynchronous message to the client computer 108 over the network 134 (step 216) using a TCP/IP remote procedure call to provide notification that a realtime telephone call is coming in to the subscriber's mailbox. According to one embodiment of the present invention, notification consists of presenting a new call notification window 308 on the visual display of the computer 108, alerting the subscriber of the incoming call (see FIG. 3). In addition, caller identification (caller ID) information may be presented to the user as part of the new call notification in a provided box 310.

In response to the notification, the subscriber may specify any of several actions. The subscriber may choose to monitor the caller (step 222) by pressing the "monitor caller" button 312 in the notification window 308. Pressing the "monitor caller" button 312 causes a request to monitor to be sent over the computer network 134 to the RTP service module 142. The TUI interface 138 then sets up a remote transmission protocol audio session.

Referring now to FIG. 2B, the incoming message is recorded normally (step 224), and a copy of the audio message is simultaneously provided to the client at the registered IP address (step 226) by the RTP service module 142 by duplicating the bytes of audio data comprising the incoming message. The audible message is output through the speaker 128 associated with the client computer 108 in realtime. The audio message is provided by the message monitor server 140 to the client computer 108 through the computer network 134 as a remote transmission protocol (RTP/RTCP) audio stream. Accordingly, an asynchronous protocol, such as TCP/IP, is used in combination with an audio transmission protocol, such as the International Telecommunications Union (ITU) G-711, G-723 or G-729 transmission protocols to provide a Voice Over Internet Protocol audio stream. The simultaneous recording of the incoming message 224 and playback of the message at the registered IP address 226 continues until either the caller telephone 106 is placed on hook or a maximum message recording time has been reached (step 228), in which case the system returns to step 206 (FIG. 2A) to await further incoming telephone calls.

While monitoring the message being recorded, the subscriber may choose to ignore the call by pressing the "ignore call" button 314 (step 230) in the notification window 308, in which case the message monitor server 140 ceases to provide the audio message to the client computer 108 (step 232, FIG. 2B), the RTP service module 142 tears down the RTP audio stream connection, and the incoming message continues to be recorded normally (step 220, FIG. 2A).

Figure 4:
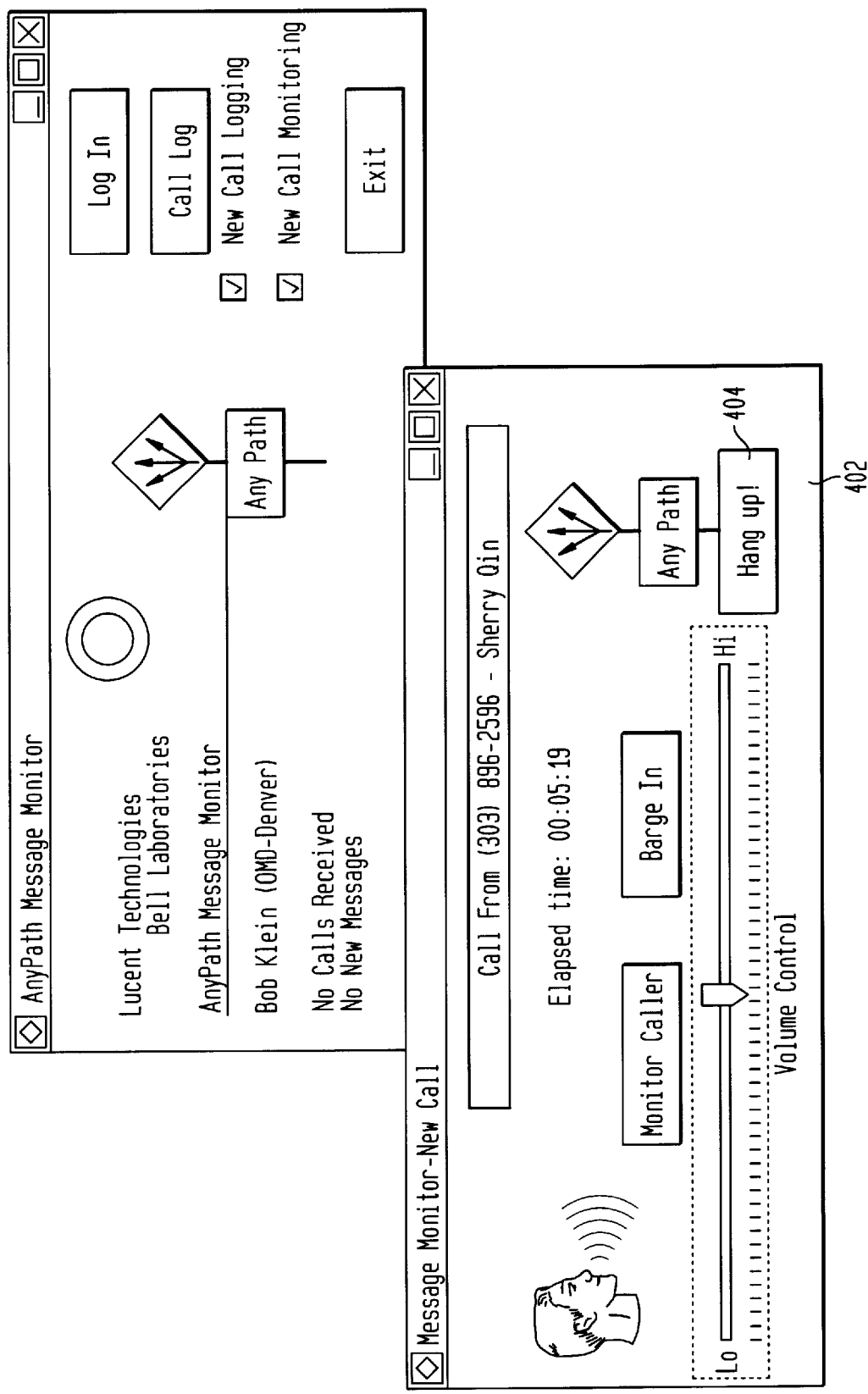
FIG. 4 is a screen shot of another GUI window according to an embodiment of the present invention.

With reference again to FIG. 2A, as yet another option, the subscriber may choose to barge in at step 234 by hitting the "barge-in" button 316 in the notification window 308 in response to an incoming telephone call. Where the subscriber chooses to barge in 234, the caller is notified that the subscriber is available to take the call at step 236 (FIG. 2C). Recording of the message is discontinued (step 238, FIG. 2C), and a two-way RTP audio communications session is then established between the RTP service module 142 of the message server 102 and the client computer 108, over the network 134 (step 240, FIG. 2C). At this same time, the TUI interface module 138 stops recording the message from the caller in the database 116, and discards any portion of the message that has already been recorded. The subscriber and the caller may then conduct a normal conversation, with the subscriber using the speaker 128 and microphone 130 of the client computer 108 for the output and input of audible signals respectively, and with at least the portion of the transmission circuit between the message server 102 and the client computer 108 comprising the network 134. Therefore, at least a portion of the telephone conversation is transmitted asynchronously over the network 134, with the message server 102 providing an IP telephony gateway functionality. Upon selection of the "barge in" function, the GUI running on the client's computer 108 displays a call in progress window 402 (see FIG. 4). The call-in-progress window 402 presents the subscriber with a "hang up" button 404 to allow the subscriber to terminate the call. At step 242 (FIG. 2C), upon the detection of on-hook at the caller end, or the pressing of the "hang up" button 404 by the subscriber, the two-way audio session is discontinued. The system then returns to step 206 (FIG. 2A) to await the next incoming telephone call.

The subscriber may also choose to barge into a call that is being monitored (step 244, FIG. 2B) by selecting the "barge in" button 316. The system then proceeds as described above where the subscriber has selected the "barge in" button 316 (step 234, FIG. 2A) upon notification of the incoming call (step 216). However, in this instance the RTP audio session will have already been enabled, thus all that is required to provide two-way communications is to enable the microphone 130 associated with the client computer 108.

The subscriber may also take no action, in which case the incoming message is recorded normally (step 220) until the caller telephone 106 sends an on-hook signal or a maximum message record time is reached. The subscriber may also choose to begin monitoring the call (step 222), to barge in to the call (step 234), or to ignore the call (step 218) and cause the notification window 308 to be hidden, by pressing the appropriate button 312, 314 or 316 while the incoming message is being recorded.

Figure 5:
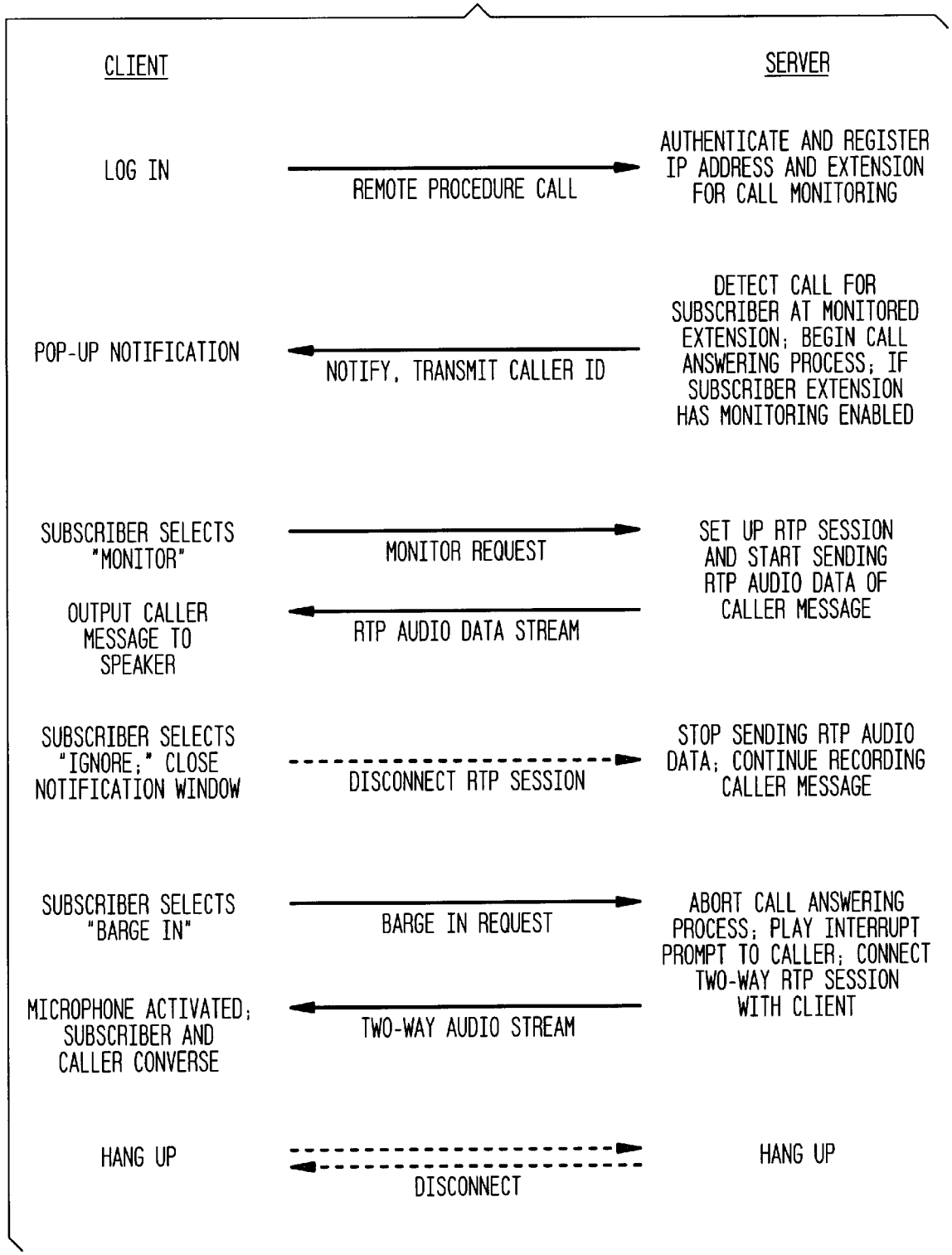
FIG. 5 illustrates functions of and communications between components of the messaging system according to an embodiment of the present invention.

Various of the functions performed by the message server 102 and the client computer 108, according to one embodiment of the present invention, are illustrated in FIG. 5. In particular, FIG. 5 illustrates generally some of the communications that can take place between the message server 102 and the client computer 108.

To discontinue monitoring of telephone calls to the subscriber telephone 104, the subscriber can terminate the message monitor application program 144 by pressing the exit button 318 or by closing the program 144 using the close button 320. When the user terminates the message monitor application program 144, the monitoring of the subscriber's extension is unregistered from the TUI interface module 138.

Of course, various modifications to the system 100 described above can be contemplated. For instance, certain of the various user operations may be selected by default, such as where the subscriber desires to monitor every incoming telephone call, by adding provisions for default settings to the described embodiment. According to one embodiment of the system 100, when multiple calls are received at the subscriber telephone 104, the message monitor application program 144 may present the user with multiple notification windows 308. The subscriber may choose to listen to the messages, ignore, or to barge in by activating the appropriate button 312, 314, or 316 in the notification window 308. According to a further embodiment, the system 100 may allow the subscriber to select all internal or external calls for monitoring where the subscriber telephone is part of a private branch exchange, or to monitor only messages originating from selected caller telephone 106 extensions or line numbers. According to yet another embodiment, the system 100 may allow a single mailbox to be monitored from multiple client computers 108. For example, a group may monitor a single subscriber telephone 104. When a call is received at the subscriber telephone 104, one or more members of the group may monitor the call, and one or more members may barge in. When multiple members barge in, a conference call is established. The system 100 may also allow the monitoring of a plurality of telephones 104 from a single client computer 108. Such variations can be made without departing from the spirit and the scope of the invention and without diminishing its attendant advantages, and it is intended that such variations be covered by the appended claims.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include alternative embodiments to the extent permitted by the prior art.

What is claimed is:

1. A message monitoring system, comprising:
    a subscriber telephone;
    a client computer;
    a messaging server for providing a realtime messaging service, comprising:
        an interface for interconnecting said server to said subscriber telephone;
        a database for storing subscriber information and for storing audio stream data from an incoming telephone call;
        a message monitor server for providing information regarding said incoming telephone call to said client computer;
        an interface module for providing said audio stream data from said incoming telephone call to said database for storage; and
        a remote transfer protocol service module; and
    a computer network interconnecting said client computer and said remote transfer service module of said messaging server, wherein said audio stream data from said incoming telephone call is transmitted over said computer network and provided to said client computer in realtime.

2. The system of claim 1, wherein said computer network comprises the Internet.

3. The system of claim 1, wherein said computer network comprises an Intranet.

4. The system of claim 1, wherein said client computer comprises a personal computer.

5. The system of claim 1, further comprising a speaker and a microphone interconnected to said client computer.

6. The system of claim 1, wherein said audio stream data is transmitted asynchronously.

7. The system of claim 1, further comprising a client application associated with said client computer to provide a user interface, wherein a user may choose to ignore, to monitor or to barge-in to an incoming telephone call.

8. The system of claim 1, wherein said audio stream data is transmitted between said messaging server and said client computer such that a caller and a user can conduct a conversation with said user in realtime.

9. The system of claim 8, wherein said audio stream data is transmitted using a Voice over Internet Protocol.

10. A method of monitoring messages, comprising:
    providing a messaging server having a mailbox for a subscriber;
    in response to an audio stream message received at the mailbox of said subscriber from a caller, notifying said subscriber in realtime that said audio stream message is being received; and
    storing said audio stream in said mailbox while simultaneously providing said audio stream in realtime to said subscriber over a data network.

11. The method of claim 10, wherein said notification is made to an address specified by said subscriber.

12. The method of claim 10, further comprising allowing said subscriber to selectively engage in two-way audio communications with said caller in realtime.

13. The method of claim 12, further comprising discarding said stored audio stream after two-way audio communications have been engaged by said subscriber.

14. The method of claim 10, wherein said step of notifying said subscriber comprises providing said subscriber with caller identification information.

15. The method of claim 14, wherein said caller identification information is provided visually.

16. The method of claim 10, wherein said data network is the Internet.

17. The method of claim 10, wherein said data network is an Intranet.

18. The method of claim 10, wherein said audio stream is provided as a Voice over Internet Protocol audio stream.

19. The method of claim 10, wherein said audio stream is transmitted over said data network asynchronously.

20. An apparatus for remotely monitoring telephone calls, comprising:
    a messaging server having a mailbox for a subscriber;
    means for notifying said subscriber when an audio stream message is being received at said mailbox of said subscriber in realtime;
    means for storing said audio stream in said mailbox; and
    means for providing said audio stream to said subscriber in realtime over a data network.

* * * * *